United States Patent [19]

Smith et al.

[11] Patent Number: 5,769,498
[45] Date of Patent: Jun. 23, 1998

[54] DETACHABLE VEHICLE SEAT BOLSTER

[75] Inventors: Michael L. Smith, Troy; Ronald L. Miotto, Wayne; Denise A. Wilson, West Bloomfield, all of Mich.

[73] Assignee: Lear Corporation, Southfield, Mich.

[21] Appl. No.: 848,047

[22] Filed: Apr. 28, 1997

Related U.S. Application Data

[60] Provisional application No. 60/037,068, Feb. 12, 1997.
[51] Int. Cl.⁶ ........................................................ A47C 7/00
[52] U.S. Cl. ................................... 297/440.1; 297/452.34
[58] Field of Search .......................... 297/440.1, 452.34,
297/452.35, 452.36, 284.1, 284.9, 452.18,
411.26, 411.27, 411.28, 411.29, 411.25,
411.23, 411.4, 486, 464

[56] References Cited

U.S. PATENT DOCUMENTS

| | | |
|---|---|---|
| 1,831,143 | 11/1931 | Shambaugh . |
| 3,027,196 | 3/1962 | Hamilton . |
| 3,424,493 | 1/1969 | Gottfried et al. . |
| 3,837,706 | 9/1974 | Suttles . |
| 3,883,175 | 5/1975 | Rodaway . |
| 4,615,561 | 10/1986 | Nomura . |
| 4,779,930 | 10/1988 | Rosen . |
| 4,810,035 | 3/1989 | Takahashi . |
| 5,149,173 | 9/1992 | Jay et al. . |
| 5,338,094 | 8/1994 | Perry . |
| 5,662,381 | 9/1997 | Roossien et al. . |

FOREIGN PATENT DOCUMENTS

| | | |
|---|---|---|
| 1373267 | 8/1964 | France . |
| 376729 | 7/1932 | United Kingdom . |

*Primary Examiner*—Milton Nelson, Jr.
*Attorney, Agent, or Firm*—Brooks & Kushman P.C.

[57] ABSTRACT

A vehicle seat bolster is adapted for attachment to a seat back, wherein the seat back has first and second sides and front and rear portions. A center portion of the seat bolster is removably attachable to the rear portion of the seat. First and second opposing arms extend from the center portion. Each arm includes a distal end which is removably attachable to the respective first and second side of the seat back such that the seat bolster provides lateral support for the seat back. The seat bolster is quickly disconnectable from the seat back for removal and installation of similar bolsters with varying load carrying capacity.

13 Claims, 7 Drawing Sheets

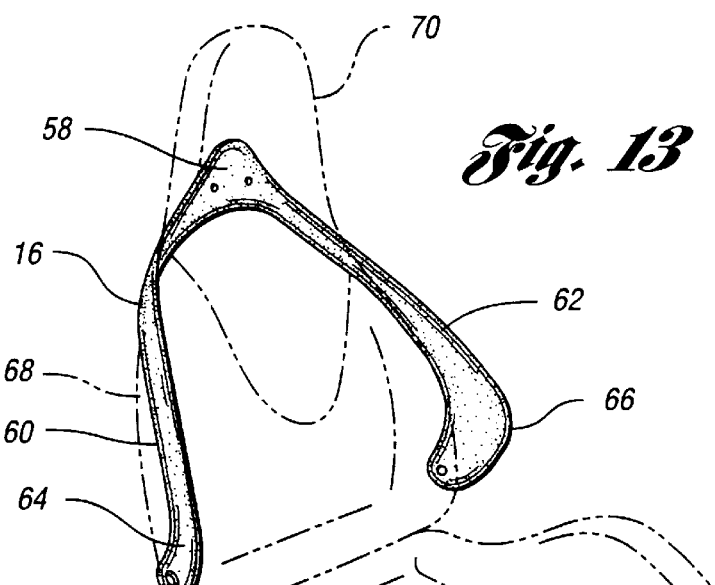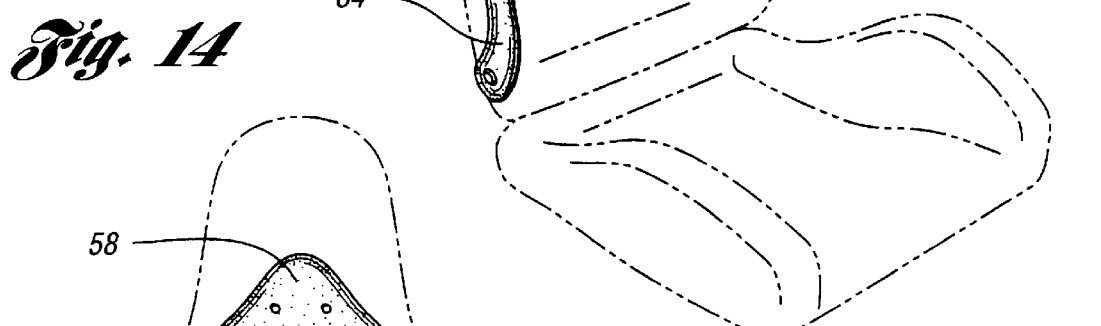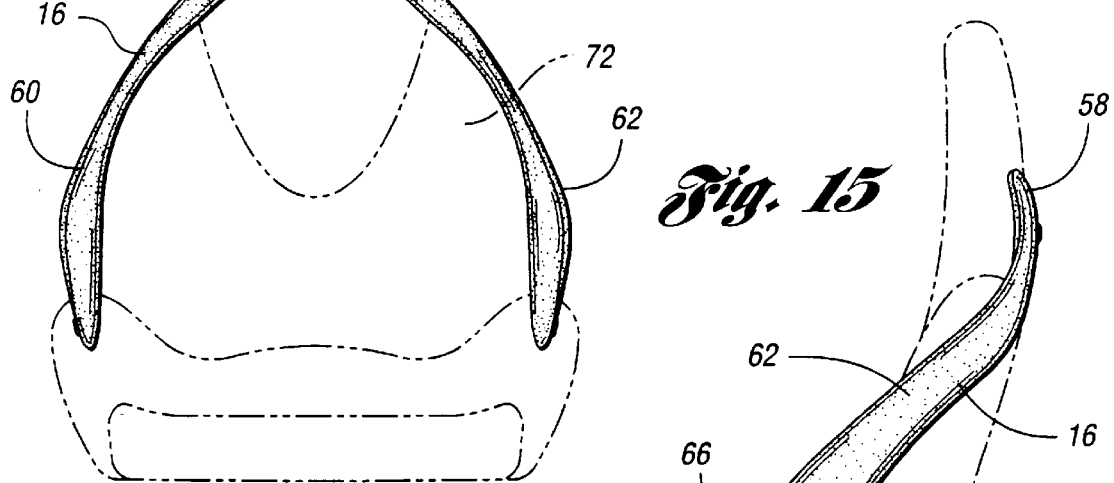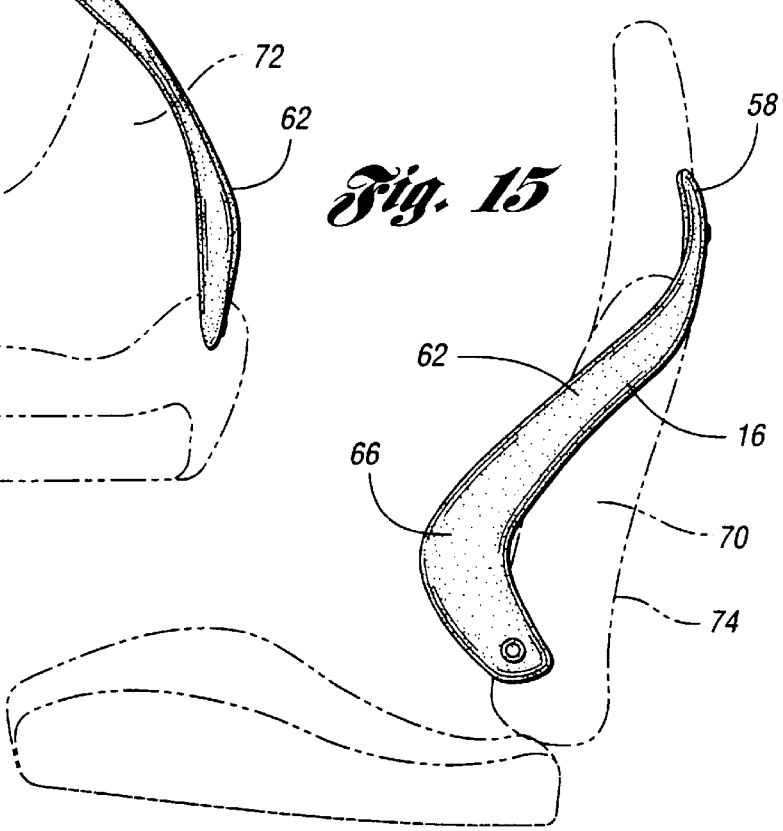

DETACHABLE VEHICLE SEAT BOLSTER

CROSS-REFERENCE TO RELATED APPLICATION

This patent application is related to provisional application Ser. No. 60/037,068, filed Feb. 12, 1997.

TECHNICAL FIELD

The present invention relates to a detachable vehicle seat bolster which provides lateral support for a vehicle seat back.

BACKGROUND OF THE INVENTION

Vehicle seat back frames are typically structured to support loads in compression and tension along the longitudinal direction of the vehicle as the vehicle accelerates and decelerates. Typically, minimal structure is provided for reacting lateral loads which occur while the vehicle turns at high speeds.

Certain vehicles, particularly those used in autocross, or other high speed events, typically subject the occupant and seat to high lateral loads when maneuvering. Accordingly, it is desirable to provide an apparatus for providing lateral support in a seat back in a manner which is aesthetically pleasing, and such that the apparatus is easily removable or replaceable for varying degrees of support.

DISCLOSURE OF THE INVENTION

The present invention provides a detachable seat bolster for supporting such lateral loads. The seat bolster of the present invention is detachable to facilitate quick and easy exchange of bolsters for use in different driving conditions under varying lateral loads. For example, this detachable bolster is useful in vehicles which are used both for normal street driving and for autocross racing. The bolsters may be exchanged for varying the lateral load carrying capacity, or the bolster may be removed altogether for normal street driving.

More specifically, the present invention provides a vehicle seat bolster adapted for attachment to a seat back, wherein the seat back has first and second sides and front and rear portions. The seat bolster includes a center portion which is removably attachable to the rear portion of the seat. First and second opposing arms extend from the center portion, and each arm has a distal end which is removably attachable to the respective first and second sides of the seat back. Accordingly, the seat bolster is configured to provide lateral support for the seat back.

In a preferred embodiment, the bolster includes a gap formed along an edge thereof, and a trim cover is provided with opposing ends which are insertable into the gap. A Christmas tree-type strip fastener is insertable into the gap for securing the ends of the trim cover within the gap.

A lobe-shaped attachment member extends from the distal end of each of the bolster arms, and an attachment housing is secured to each of the first and second sides of the seat. The attachment housings are each adapted to receive the lobe-shaped attachment member and to secure the lobe-shaped attachment member when the seat bolster is rotated with respect to the seat back.

Accordingly, an object of the present invention is to provide a vehicle seat bolster which is easily removable and exchangeable for providing varying degrees of lateral support in a vehicle seat back.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 13 shows a perspective view of a seat bolster in accordance with the present invention with the seat assembly shown in phantom;

FIG. 14 shows a frontal view of the seat bolster shown in FIG. 13; and

FIG. 15 shows a side view of the seat bolster shown in FIG. 13.

BEST MODE FOR CARRYING OUT THE INVENTION

Figure 1:
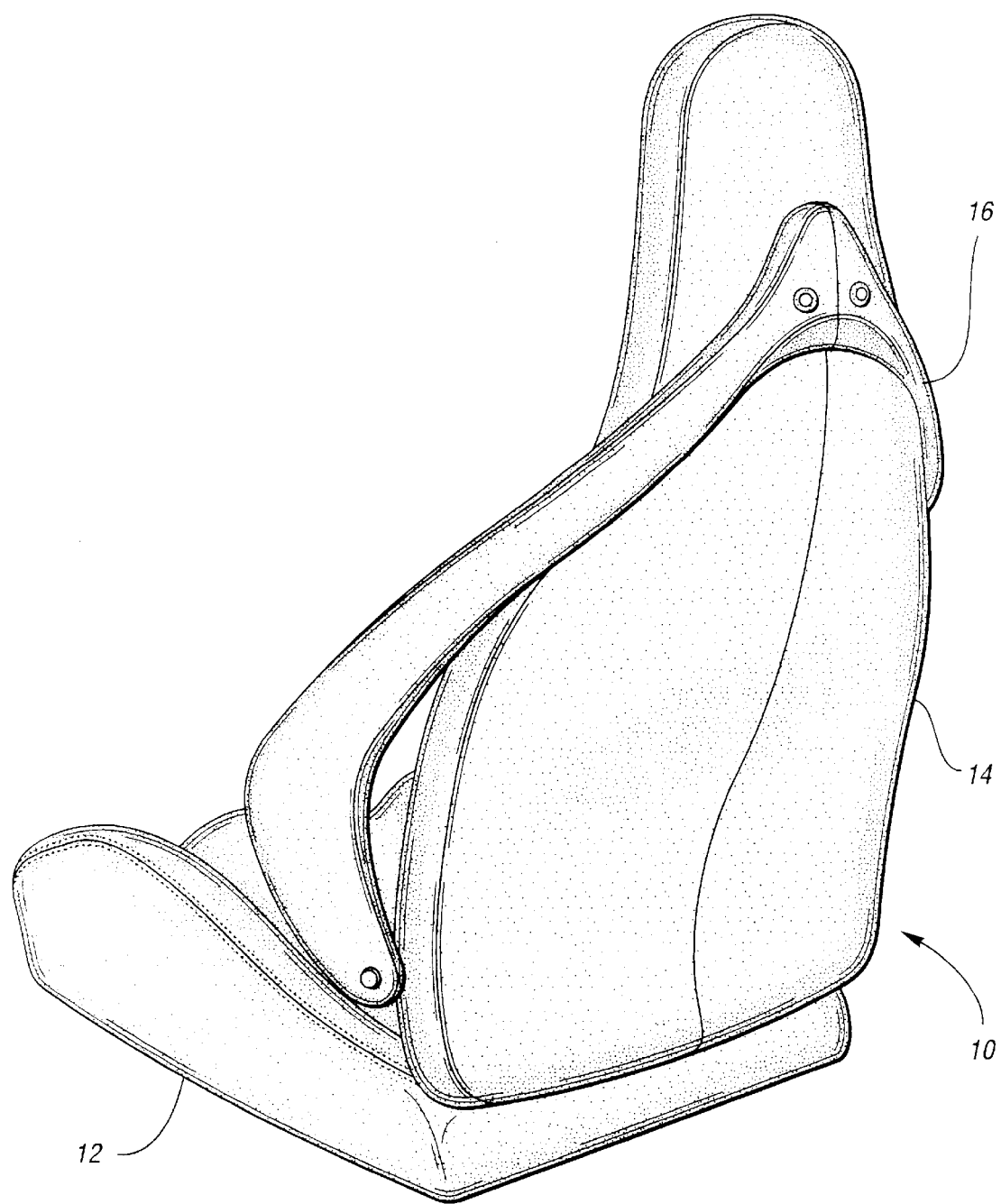
FIG. 1 shows a perspective view of a vehicle seat bolster secured to a seat assembly in accordance with the present invention.
Figure 2:
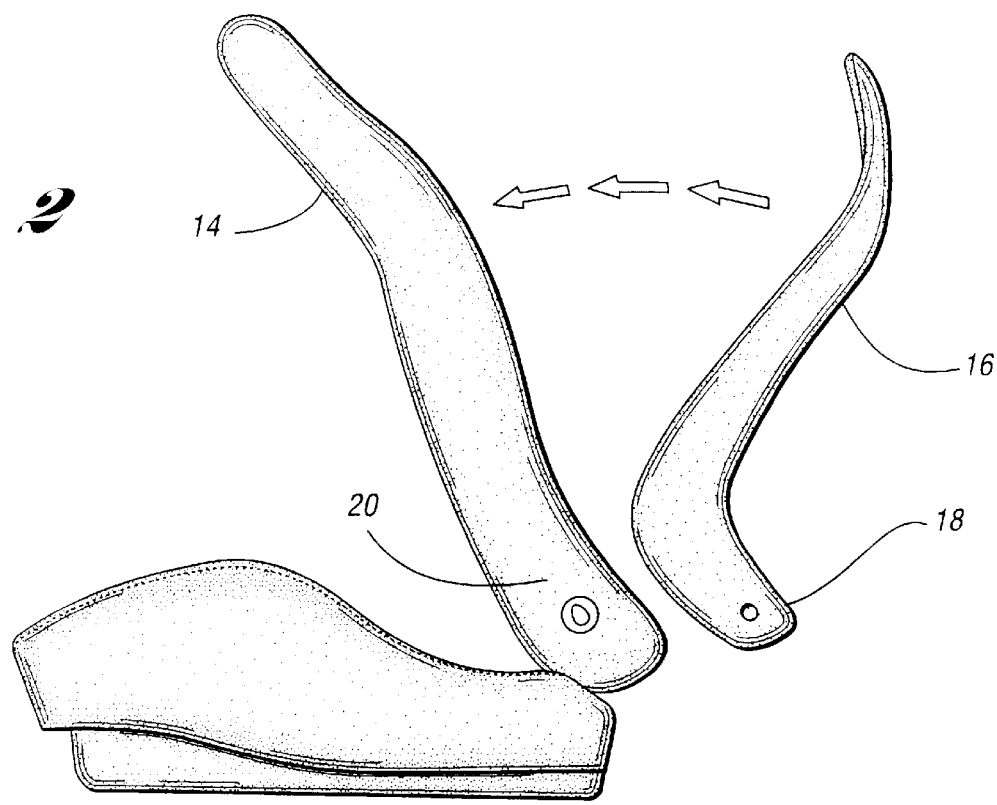
FIG. 2 shows a side view of a vehicle seat bolster prior to installation onto a seat assembly in accordance with the present invention.
Figure 3:
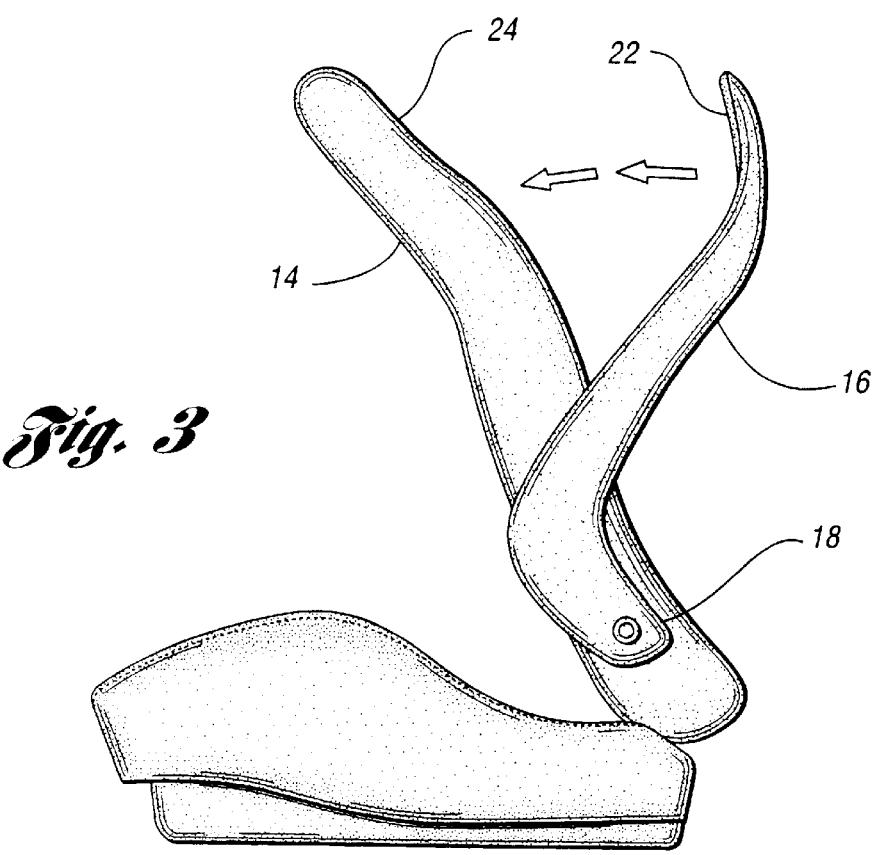
FIG. 3 shows a side view of the seat bolster and seat assembly of FIG. 2, with the distal ends of the seat bolster secured to the seat back.
Figure 4:
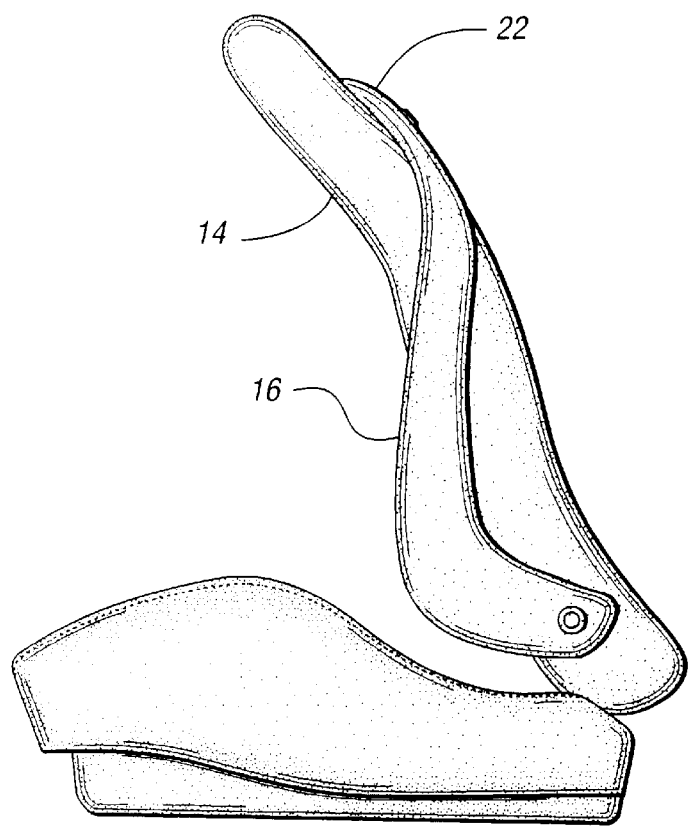
FIG. 4 shows a side view of the seat bolster and vehicle seat assembly of FIG. 3 with the seat bolster fully secured to the seat back.
Figure 5:
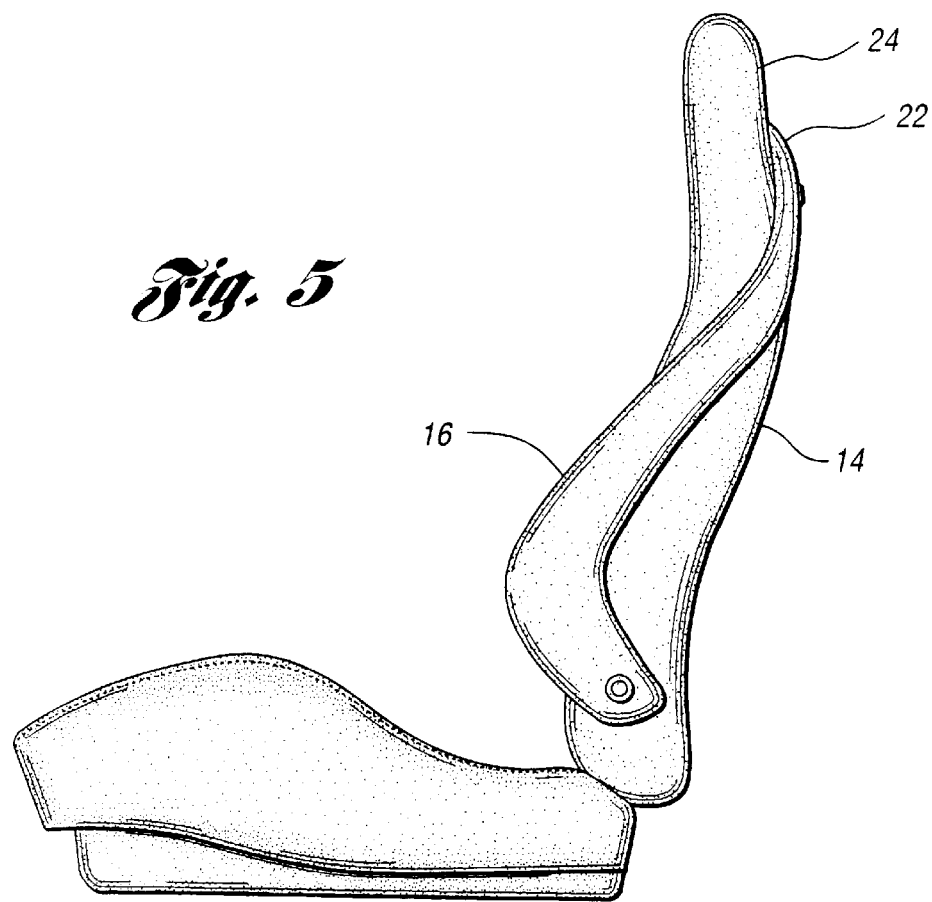
FIG. 5 shows a side view of the vehicle seat bolster and sea assembly of FIG. 4 with the seat back in the upright position.
Figure 6:
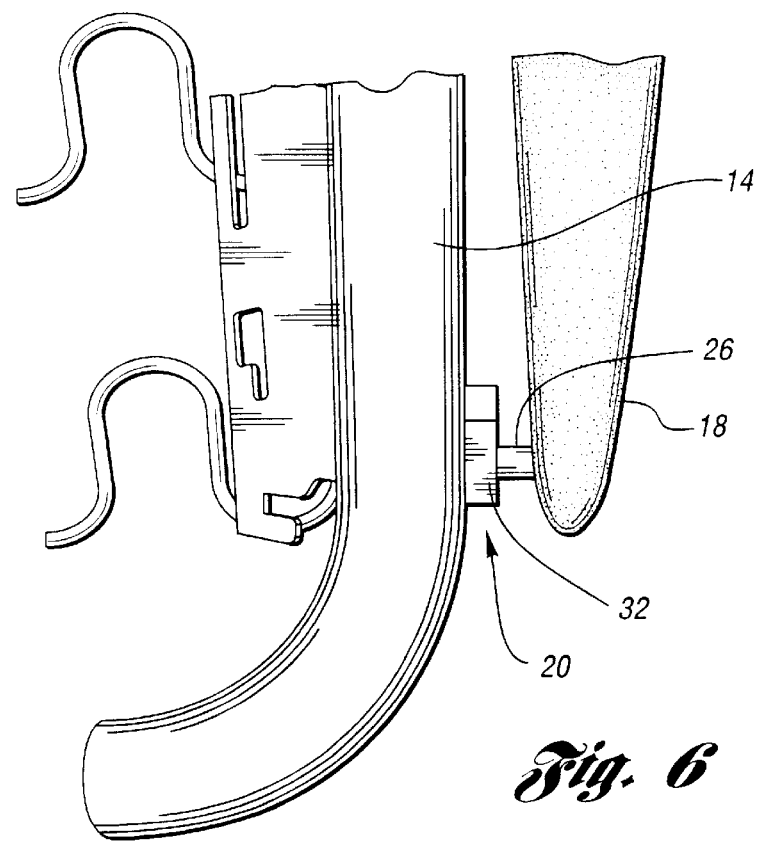
FIG. 6 shows a partially cut-away front view of a vehicle seat bolster and seat back in accordance with the present invention.
Figure 7:
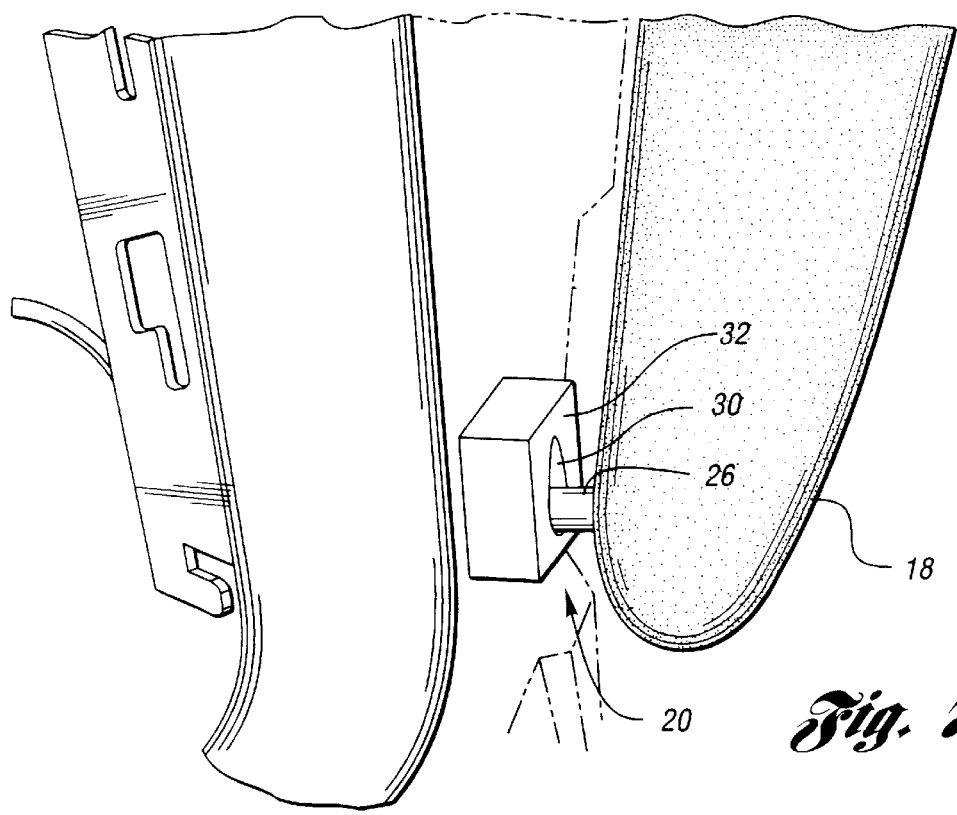
FIG. 7 shows a partially cut-away perspective view of a vehicle seat bolster and seat back in accordance with the present invention.
Figure 8:
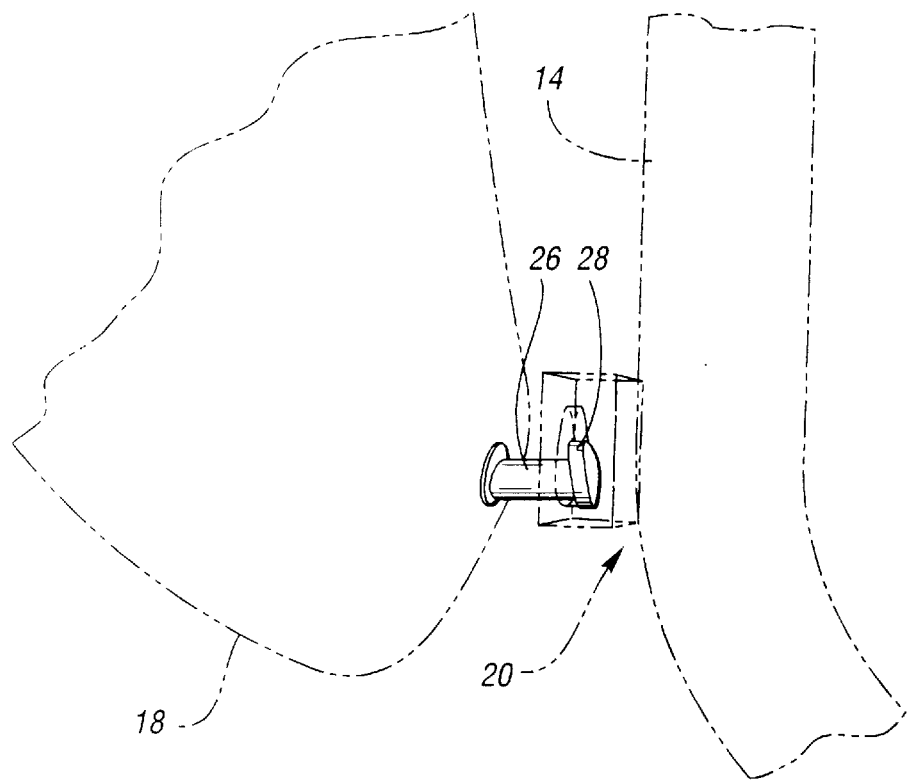
FIGS. 8 shows a perspective view of a lobe-shaped attachment member extending from the distal end of a vehicle seat bolster in accordance with the present invention, wherein the seat bolster and seat back are shown in phantom.

Referring to FIG. 1, a seat assembly 10 typically comprises a lower seat 12 and a seat back 14. The present invention provides a detachable seat bolster 16 which attached to the seat back 14 for providing lateral load strength.

Turning to FIGS. 2–5, the attachment sequence for the seat bolster 16 is illustrated. As shown, the lower portion 18 is first attached to the attachment portion 20 of the seat back 14. The bolster 16 is then pivoted so that the upper portion 22 of the seat bolster 16 is positioned against the upper portion 24 of the seat back 14. The upper portion 22 of the seat bolster 16 is then secured to the upper portion 24 of the seat back 14 to complete the assembly.

Figure 9:
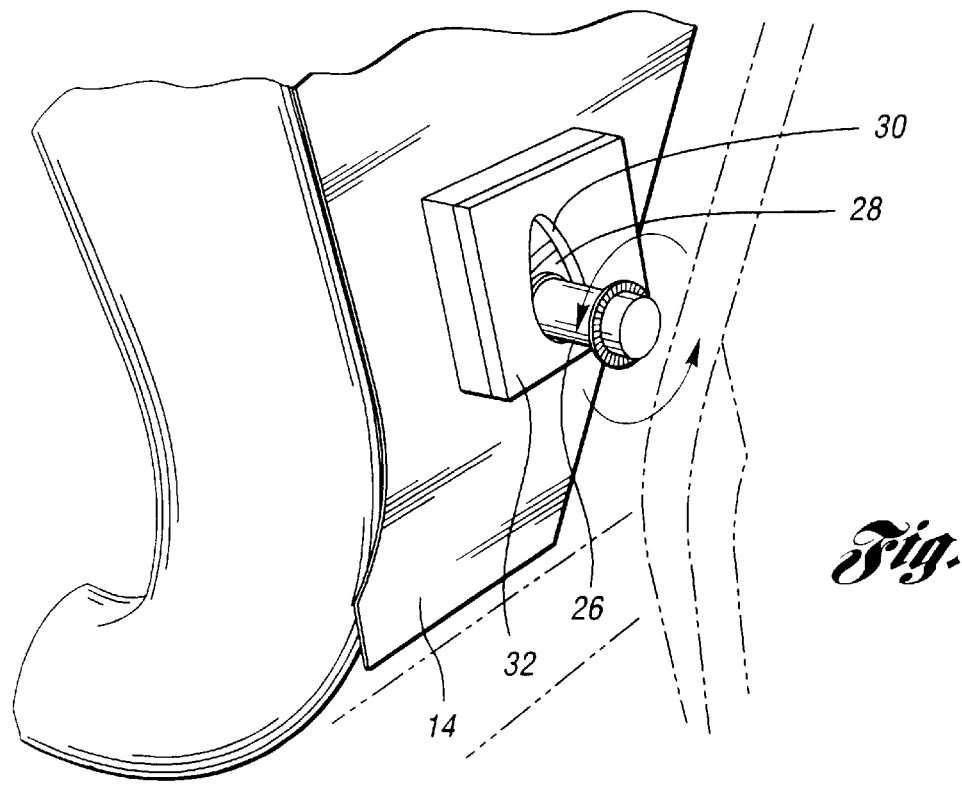
FIG. 9 shows a perspective view of an attachment member and attachment housing secured to a vehicle seat back in accordance with the present invention.

Referring to FIGS. 6–9, a detailed illustration is provided showing the attachment of the lower portion 18 of the seat bolster 16 to the attachment portion 20 of the seat back 14. As shown, the lower portion 18 of the seat bolster 16 includes a stud 26 extending therefrom with a lobe 28 disposed at the distal end thereof. The stud 26 is integrally molded as part of the bolster. The lobe 28 is configured to fit within a slot 30 formed in the attachment housing 32, which is attached to the seat back 14. Once the lobe 28 is passed through the slot 30, the seat bolster 16 may then be pivoted from the position shown in FIG. 3 to the position shown in FIG. 4, at which point the lobe 28 is secured within the attachment housing 32, as illustrated in FIG. 9.

Figure 10:
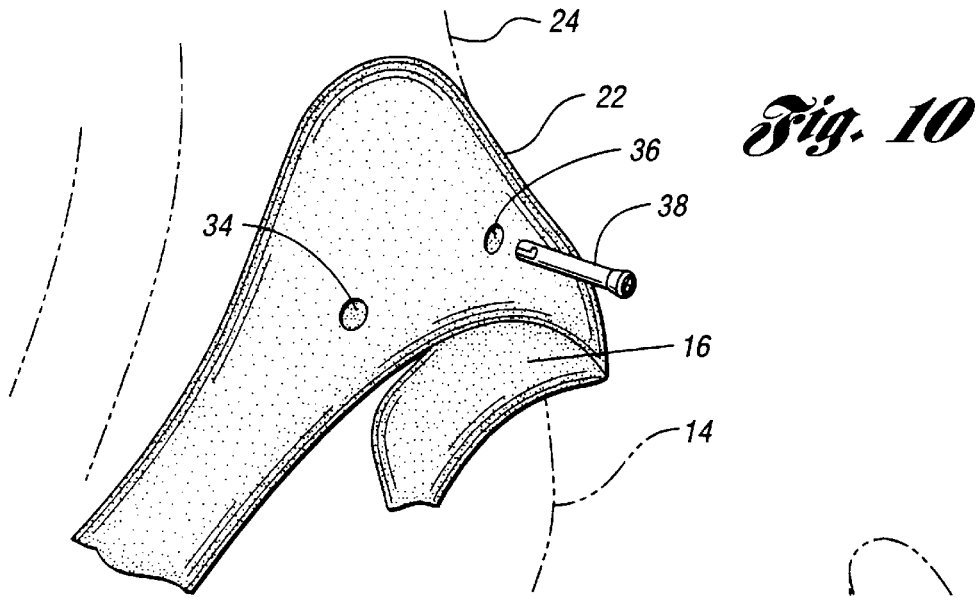
FIG. 10 shows a cut-away perspective view of a seat bolster and attachment stud in accordance with the present invention.
Figure 11:
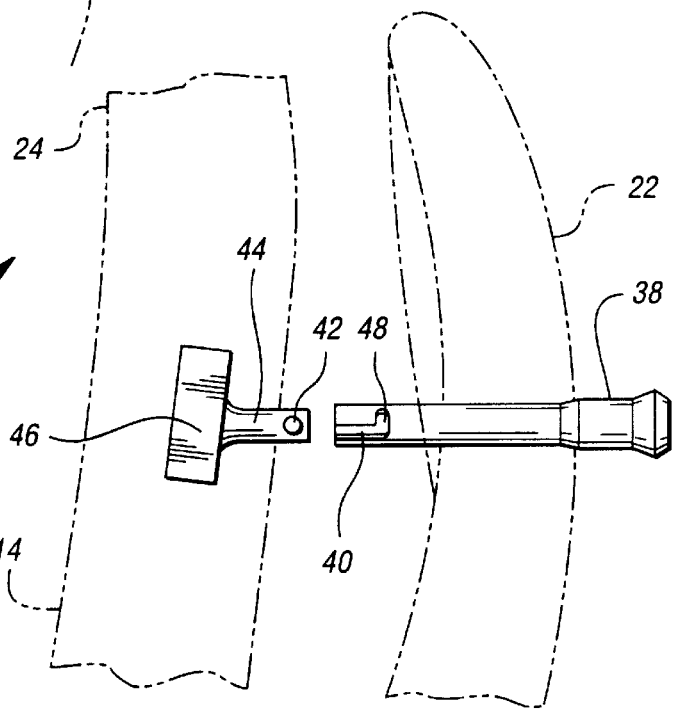
FIG. 11 shows a side view of an attachment stud and attachment feature in accordance with the present invention, with the seat bolster and seat back shown in phantom.

Turning to FIGS. 10 and 11, an embodiment is shown for attaching the upper portion 22 of the seat bolster 16 to the upper portion 24 of the seat back 14. As shown, the upper portion 22 of the seat bolster 16 includes apertures 34,36 formed therethrough for receiving attachment studs 38. The attachment studs 38 each include an L-shaped slot 40 formed therein for cooperation with a nubbin 42 which extends radially from a rod 44, which is secured to a base portion 46. In this configuration, the attachment studs 38 may be inserted through the apertures 34,36 such that the nubbin 42 slides along the slot 40. When the nubbin 42 bottoms out in the slot 40, the stud 38 is rotated to move the nubbin 42 into the bottom portion 48 of the L-shaped slot 40 to secure the upper portion 22 of the seat bolster 16 to the upper portion 24 of the seat back 14.

Figure 12:
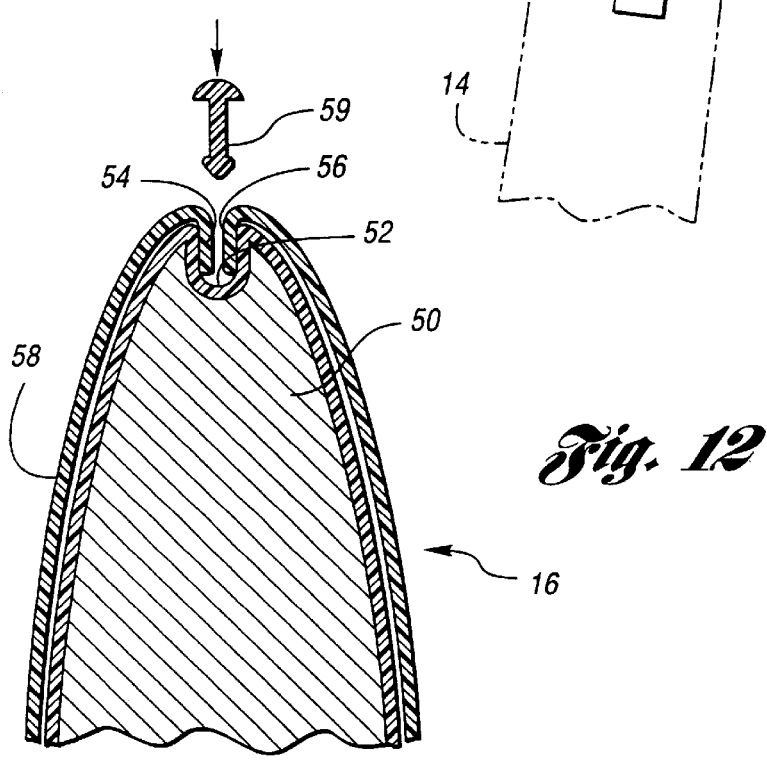
FIG. 12 shows a schematically arranged sectional view of a seat bolster, trim cover, and fastener in accordance with the present invention.

Referring to FIG. 12, a schematically arranged cut-away, cross-sectional view of the seat bolster 16 is shown. The seat bolster 16 includes a carbon fiber base portion 50 having an approximately 2.5 millimeter gap 52 formed along an edge thereof so that the opposing ends 54,56 of the trim cover 58 may be wedged into the gap 52 for covering the carbon fiber base portion 50. Optionally, a Christmas tree-type strip fastener 59 could be inserted into the gap 52 along with the opposing ends 54,56 of the trim cover 58 to further secure the trim cover over the carbon fiber base portion 50.

FIGS. 13–15 shows various views of the seat bolster 16 as previously described. As shown, the seat bolster 16 includes a central portion 58, from which opposing arms 60,62 extend. As shown, the arms 60,62 each include a forwardly protruding portion 64,66, respectively. Accordingly, each opposing arm 60,62 is generally V-shaped when viewed facing perpendicularly with respect to the first and second sides 68,70 of the seat back, as shown in FIG. 15. The forwardly protruding portion 64,66 forms the apex of the V-shape of the respective arm 60,62.

Referring to FIG. 14, the seat bolster 16 generally forms an inverted V-shape when viewed perpendicularly with respect to the front portion 72 or rear portion 74 of the seat back.

While the best mode for carrying out the invention has been described in detail, those familiar with the art to which this invention relates will recognize various alternative designs and embodiments for practicing the invention within the spirit and scope of the invention.

What is claimed is:

1. A vehicle seat bolster adapted for laterally supporting a seat back, wherein the seat back has first and second sides and front and rear portions, the bolster comprising:

a center portion including an attachment component for removable attachment to the rear portion of the seat back; and first and second opposing arms extending from the center portion, each said arm having a distal end including an attachment member for removable attachment to the respective first and second sides of the seat back such that the seat bolster provides lateral support for the seat back.

2. The vehicle seat bolster of claim 1, wherein each said opposing arm comprises a forwardly protruding portion, such that each opposing arm is generally V-shaped when viewed facing perpendicularly with respect to the first and second sides and the forwardly protruding portion forms the apex of the V-shape.

3. The vehicle seat bolster of claim 1, wherein said seat bolster generally forms an inverted V shape when viewed perpendicularly with respect to the rear portion of the seat back.

4. The vehicle seat bolster of claim 1, wherein the seat bolster comprises a carbon fiber material.

5. The vehicle seat bolster of claim 1, wherein the bolster comprises a gap formed along an edge thereof, a trim cover having ends insertable into the gap, and a Christmas tree-type strip fastener insertable into the gap for securing said ends of the trim cover.

6. A vehicle seat assembly, comprising:

a seat back having first and second sides and front and rear portions;

a seat having a center portion including an attachment component for removable attachment to the rear portion of the seat back; and first and second opposing arms extending from the center portion, each said arm having a distal end including an attachment member for removable attachment to the respective first and second sides of the seat back such that the seat bolster provides lateral support for the seat back.

7. The vehicle seat assembly of claim 6, wherein each said opposing arm comprises a forwardly protruding portion, such that each opposing arm is generally V-shaped when viewed facing perpendicularly with respect to the first and second sides and the forwardly protruding portion forms the apex of the V-shape.

8. The vehicle seat assembly of claim 6, wherein said seat bolster generally forms an inverted V shape when viewed perpendicularly with respect to the rear portion of the seat back.

9. The vehicle seat assembly of claim 6, wherein the seat bolster comprises a carbon fiber material.

10. The vehicle seat assembly of claim 6, wherein the bolster comprises a gap formed along an edge thereof, a trim cover having ends insertable into the gap, and a Christmas tree-type strip fastener insertable into the gap for securing said ends of the trim cover.

11. The vehicle seat assembly of claim 6, wherein each said attachment member comprises a lobe-shaped attachment member extending from each said distal end; and the seat assembly further comprises an attachment housing secured to each of said first and second sides of the seat back, each said attachment housing being adapted to receive the lobe-shaped attachment member and to secure the lobe-shaped attachment member when the seat bolster is rotated with respect to the seat back.

12. The vehicle seat assembly of claim 6, further comprising:

an attachment feature secured to the seat back and having a nubbin extending therefrom; and wherein said attachment component comprises an attachment stud extending through an aperture formed in said center portion of the seat bolster, said stud having an L-shaped slot formed therein for cooperation with said nubbin for securing the seat bolster to the seat back when the attachment stud is rotated.

13. A vehicle seat assembly, comprising:

a seat back having first and second sides and front and rear portions;

a seat bolster having a center portion including an attachment component for removable attachment to the rear portion of the seat back, and first and second opposing arms extending from the center portion, each said arm having a distal end including a lobe-shaped attachment member extending therefrom for removable attachment to the respective first and second sides of the seat back such that the seat bolster provides lateral support for the seat back; and an attachment housing secured to each of said first and second sides of the seat back, each said attachment housing adapted to receive the lobe-shaped attachment member and to secure the lobe-shaped attachment member when the seat bolster is rotated with respect to the seat back.

* * * * *